US011288791B2

(12) United States Patent
Matsuda et al.

(10) Patent No.: US 11,288,791 B2
(45) Date of Patent: Mar. 29, 2022

(54) COMPONENT DISCRIMINATION APPARATUS AND METHOD FOR DISCRIMINATING COMPONENT (71) Applicant: TOYOTA JIDOSHA KABUSHIKI KAISHA, Toyota (JP)

(72) Inventors: Tomohiro Matsuda, Toyota (JP); Yutaka Sugie, Toyota (JP); Yuichi Hirano, Nisshin (JP); Shun Sato, Nagoya (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 67 days.

(21) Appl. No.: 16/784,816

(22) Filed: Feb. 7, 2020

(65) Prior Publication Data
US 2020/0293831 A1 Sep. 17, 2020

(30) Foreign Application Priority Data

Mar. 15, 2019 (JP) .............................. JP2019-048634

(51) Int. Cl.
G06T 7/00 (2017.01)
G06K 9/62 (2006.01)
G06K 9/03 (2006.01)
(52) U.S. Cl.
CPC ............... *G06T 7/001* (2013.01); *G06K 9/03* (2013.01); *G06K 9/6201* (2013.01); *G06K 9/6261* (2013.01); *G06K 9/6267* (2013.01); *G06K 2209/19* (2013.01); *G06K 2209/23* (2013.01)

(58) Field of Classification Search
CPC ......... G06K 9/6201–6215; G06K 9/03; G06K 2209/19; G06K 2209/23; G06T 7/0004–001
See application file for complete search history.

(56) References Cited

U.S. PATENT DOCUMENTS

| 2012/0057756 A1* | 3/2012 | Yoon ..................... G06K 9/6256 382/104 |
| 2015/0063627 A1* | 3/2015 | Mohammad ......... G06K 9/6202 382/103 |
| 2015/0248592 A1* | 9/2015 | Wang .................... G06F 16/583 382/201 |

(Continued)

FOREIGN PATENT DOCUMENTS

JP 2018-055597 A 4/2018

Primary Examiner — Casey L Kretzer
(74) Attorney, Agent, or Firm — Sughrue Mion, PLLC (57) ABSTRACT A component discrimination apparatus includes: an image acquisition unit configured to acquire image-pickup data obtained by taking an image of a component using a camera; a dividing unit configured to divide the image-pickup data into first image-pickup data and second image-pickup data so that they respectively include at least one characteristic part of the component; a specification identifying unit configured to identify a specification of the characteristic part in the first image-pickup data using the first image-pickup data, thereby identifying a type of the component; and a specification correctness determination unit configured to perform, using the second image-pickup data, correctness determination of whether or not a specification of the characteristic part in the second image-pickup data is the same as a specification of the component of the type identified by the specification identifying unit.

7 Claims, 7 Drawing Sheets

(56) References Cited

U.S. PATENT DOCUMENTS

2016/0301869 A1* 10/2016 Mitsunaga .............. G06F 40/42
2016/0364609 A1* 12/2016 Ivanisov .............. G06K 9/4604
2018/0292331 A1* 10/2018 Gold .................... B29C 64/153
2018/0349743 A1* 12/2018 Iurii .................... G06N 3/0454

* cited by examiner

|  | VEHICLE TYPE 1 | VEHICLE TYPE 2 | VEHICLE TYPE 3 |
| --- | --- | --- | --- |
| CHARACTERISTIC PART 1 | A | A | C |
| CHARACTERISTIC PART 2 | A | B | C |
| CHARACTERISTIC PART 3 | B | C | C |
| TOTAL PRODUCTION SHARE | 20% | 20% | 60% |

COMPONENT DISCRIMINATION APPARATUS AND METHOD FOR DISCRIMINATING COMPONENT

CROSS REFERENCE TO RELATED APPLICATIONS

This application is based upon and claims the benefit of priority from Japanese patent application No. 2019-048634, filed on Mar. 15, 2019, the disclosure of which is incorporated herein in its entirety by reference.

BACKGROUND

The present disclosure relates to a component discrimination apparatus and a method for discriminating a component.

A vehicle type discrimination apparatus and a method for discriminating a vehicle type that identify a specific vehicle type of a vehicle using existing equipment have conventionally been employed.

For example, in Japanese Unexamined Patent Application Publication No. 2018-055597, the vehicle type discrimination apparatus includes a storage unit, a detection unit, and a discrimination unit. The storage unit stores a specific vehicle type in the vehicle type classification of a vehicle in association with a reference image for each surface serving as determination criteria for a plurality of surfaces of the vehicle, and the detection unit detects a plurality of surfaces from an image-pickup image taken by an image-pickup apparatus. The discrimination unit compares each of the plurality of surfaces detected by the detection unit with the reference image for each of the surfaces to obtain a similarity indicating the degree of similarity between each of the reference images and each of the surfaces. Further, the discrimination unit performs weighted addition on the similarity of the surface by multiplying a weighting coefficient to obtain the similarity of a vehicle type, and discriminates the vehicle type of the imaged vehicles.

SUMMARY

However, the vehicle type discrimination apparatus according to Japanese Unexamined Patent Application Publication No. 2018-055597 has a problem that a calculation cost increases, and the speed of processing cannot be increased, because the captured image is carefully examined in full screen.

The present disclosure has been made in view of the above-described circumstances and provides a component discrimination apparatus capable of reducing a calculation cost required for a component discrimination and increasing the speed of processing for discrimination.

A first exemplary aspect is a component discrimination apparatus, including:
an image acquisition unit configured to acquire image-pickup data obtained by taking an image of a component using a camera;
a dividing unit configured to divide the image-pickup data into first image-pickup data and second image-pickup data so that they respectively include at least one characteristic part of the component;
a specification identifying unit configured to identify a specification of the characteristic part in the first image-pickup data using the first image-pickup data, thereby identifying a type of the component; and
a specification correctness determination unit configured to perform, using the second image-pickup data, correctness determination of whether or not a specification of the characteristic part in the second image-pickup data is the same as a specification of the component of the type identified by the specification identifying unit.

Another exemplary aspect is a method for discriminating a component, including:
acquiring image-pickup data obtained by taking an image of a component using a camera;
dividing the image-pickup data into first image-pickup data and second image-pickup data so that they respectively include at least one characteristic part of the component;
identifying a specification of the characteristic part in the first image-pickup data using the first image-pickup data, thereby identifying a type of the component; and
performing, using the second image-pickup data, correctness determination of whether or not a specification of the characteristic part in the second image-pickup data is the same as a specification of the component of the type identified by the specification identifying unit.

According to the present disclosure, it is possible to provide a component discrimination apparatus capable of reducing a calculation cost required for a component discrimination and increasing the speed of processing.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Specific embodiments to which the present disclosure is applied will be explained hereinafter in detail with reference to the drawings. However, the present disclosure is not limited to the embodiments shown below. Further, for the clarification of the explanation, the following descriptions and the drawings are simplified as appropriate.

Figure 1:
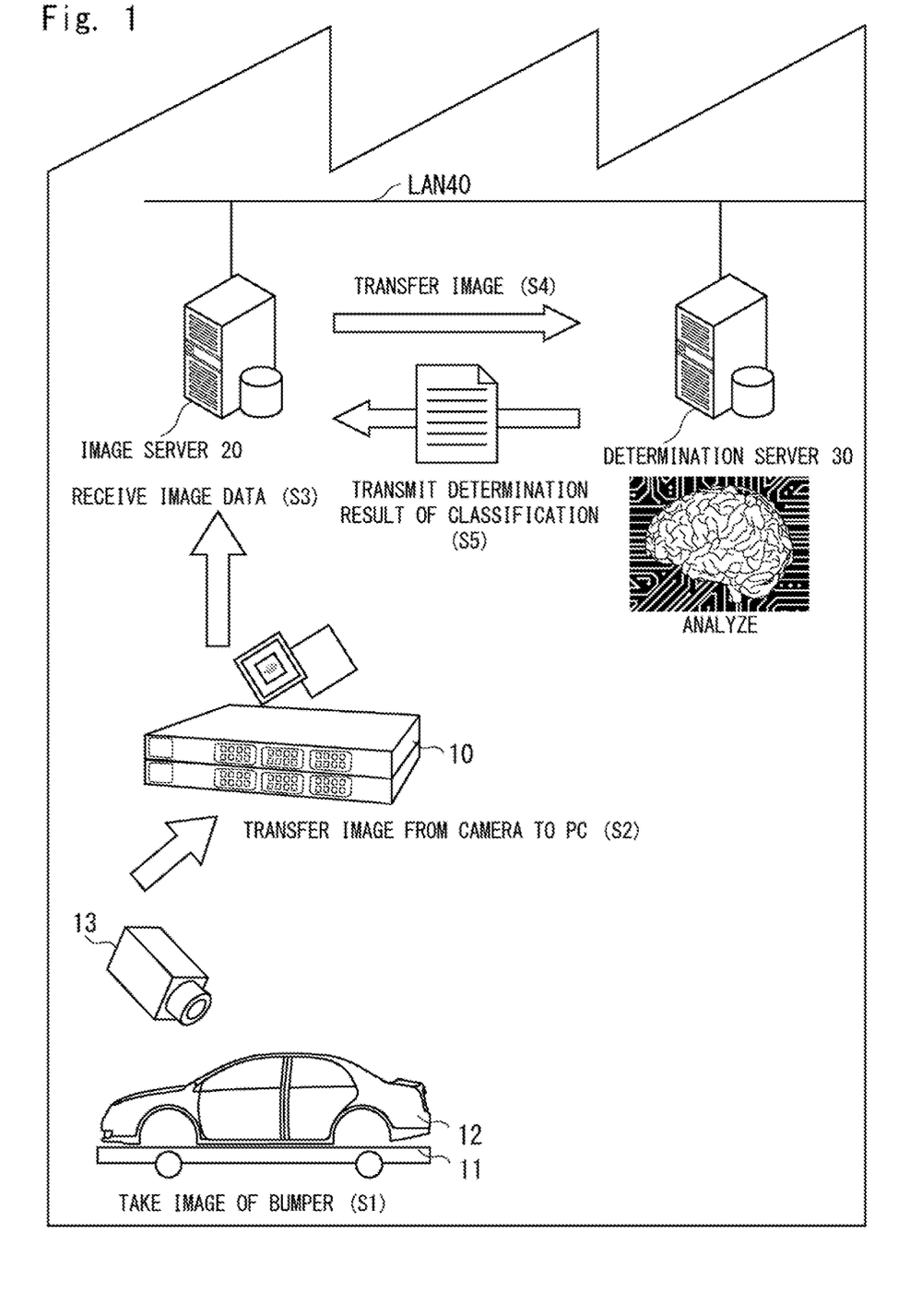
FIG. 1 is a diagram for explaining an outline of a component discrimination apparatus according to an embodiment of the present disclosure.

FIG. 1 is a diagram for explaining an outline of a component discrimination system according to an embodiment of the present disclosure. The so-called flexible manufacturing line, in which a plurality of types of assemblies are manufactured using one assembling apparatus, will be described below as an example.

In order to attach a bumper 11 to a vehicle 12, bumpers of various specifications are conveyed in front of the bumper assembling apparatus. In the existing system, operators have visually discriminated the specifications and identified the vehicle type before assembling the bumper. However, it takes a considerable amount of time to discriminate the specifications in such a manner. Therefore, in the system according to this embodiment, an image of the bumper 11 is taken by a camera 13 disposed in front of the bumper assembling apparatus (Step S1), processing for specification discrimination is automatically performed using the image, and then the vehicle type of a component is identified.

The camera 13 may be a high-resolution camera to be able to discriminate the component's color. Also, a line laser may be used in combination with a high-resolution camera in order to irradiate a component with a laser and acquire three-dimensional data. Furthermore, a plurality of cameras may be used to form a compound-eye camera in order to take separate images of the left and right parts of a component such as a bumper. Using such a compound-eye camera enables the viewing angle to be widened, thereby eliminating the need for using a line laser in combination with a high-resolution camera.

Image-pickup data taken by the camera 13 is transferred to a Personal Computer (PC) 10 through a network 40 (e.g., Ethernet (registered trademark)) (Step S2).

Examples of the network here include a local area network (LAN), and a wide area network (WAN) such as the Internet. Further, for example, the communication network can be implemented by using any known network protocol including various wired or wireless protocols, such as Ethernet, Universal Serial Bus (USB), FIREWIRE (registered trademark), Global system for Mobile Communications (GSM (registered trademark)), Enhanced Data GSM (Registered Trademark) Environment (EDGE), code division multiple access (CDMA), time division multiple access (TDMA), Bluetooth (registered trademark), Wi-Fi (registered trademark), voice over Internet Protocol (VoIP), Wi-MAX (registered trademark), or any other suitable communication protocol.

Next, an image server 20 receives an image from the PC 10 through the network (Step S3). Further, the image is transferred from the image server 20 to a determination server 30 through a network (LAN) 40 (Step S4). The determination server 30 analyzes the transferred image using artificial intelligence, determines the specification classification, and transmits the result of the determination of the specification classification to the image server 20 (Step S5). It should be noted that the specification classification of a component refers to a detailed design such as a shape, a function, performance, an operation method, standards to be adopted, and a price. In this embodiment, the vehicle type of a component (that is, the vehicle type of the final product into which the component and other components are assembled) is identified by performing specification discrimination for each of a plurality of characteristic parts in the component. The bumper of this example includes a plurality of characteristic parts such as a clearance sonar, a skid, and a fog lamp. By determining the specifications of these characteristic parts, the vehicle type (the type) of the bumper is identified. For example, a bumper for a vehicle for the United States market, a bumper for a vehicle for the Japanese market, and a bumper for a vehicle for the Chinese market are different from each other. This is because the shapes of number plates and the like in different countries are different from each other, and accordingly the shapes of the bumpers are different from each other. Note that the specification classification may include two or more classifications, or may include three or more classifications.

Figure 2:
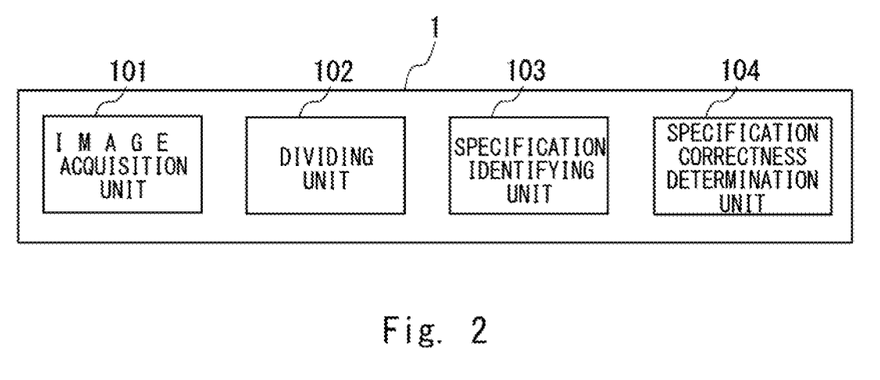
FIG. 2 is a block diagram for explaining an exemplary configuration of the component discrimination apparatus according to the embodiment of the present disclosure.

FIG. 2 is a block diagram for explaining an exemplary configuration of the component discrimination apparatus according to the embodiment of the present disclosure. A component discrimination apparatus 1 includes an image acquisition unit 101 configured to acquire image-pickup data obtained by taking an image of a component using the camera 13; a dividing unit 102 configured to divide the image-pickup data into first image-pickup data and second image-pickup data so that they respectively include at least one characteristic part of the component; a specification identifying unit 103 configured to identify a specification of the characteristic part in the first image-pickup data using the first image-pickup data, thereby identifying a type of the component; and a specification correctness determination unit 104 configured to perform, using the second image-pickup data, correctness determination of whether or not the specification of the characteristic part in the second image-pickup data is the same as the specification of the component of the type identified by the specification identifying unit. By this configuration, for example, in a manufacturing line that performs a flexible manufacturing, it is possible to reduce the time required for the processing for discriminating components having various specifications.

Figure 3:
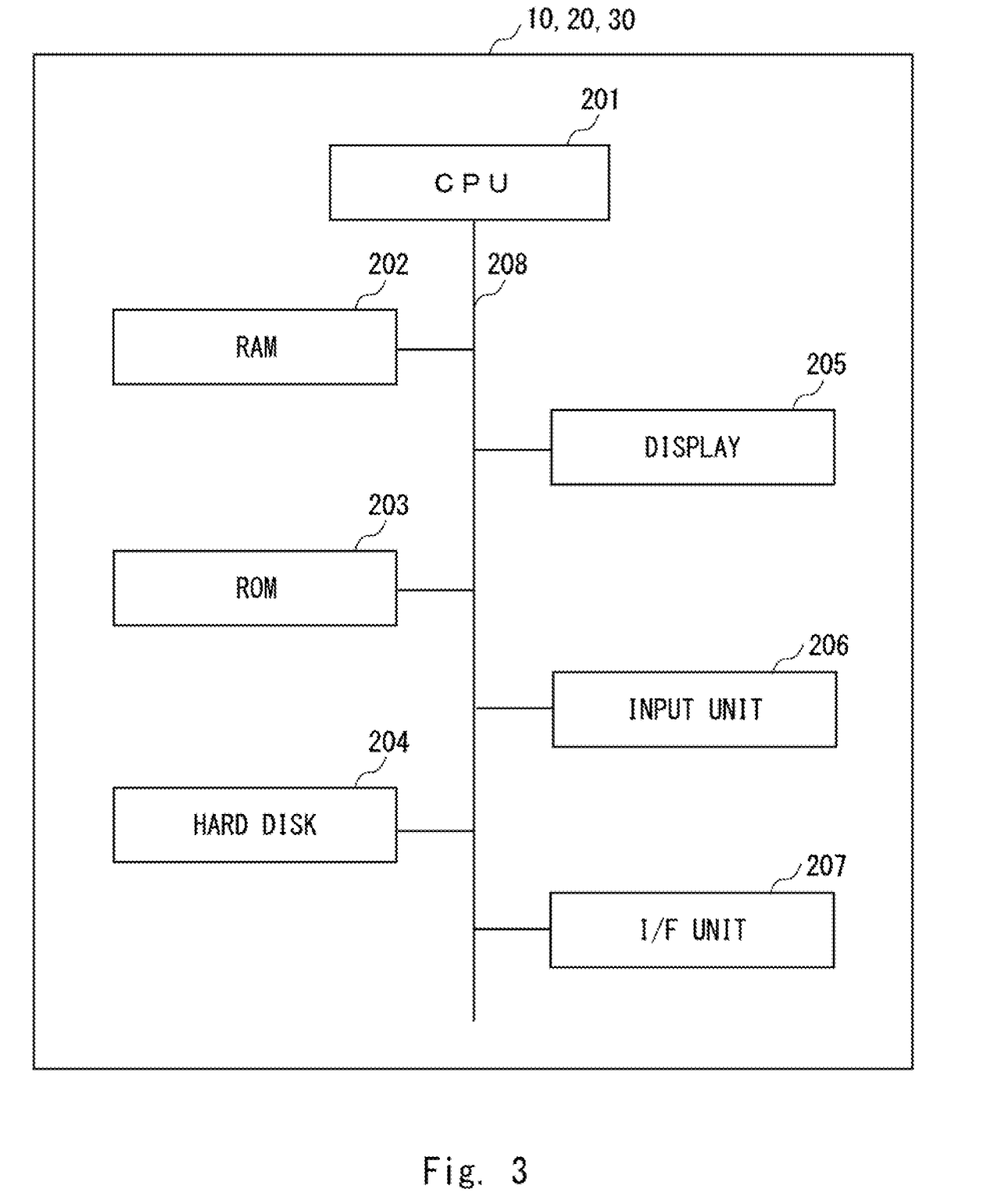
FIG. 3 is a diagram for explaining an exemplary hardware configuration of each server and PC according to the embodiment of the present disclosure.

FIG. 3 is a block diagram showing an exemplary hardware configuration example of the PC 10, the image server 20, and the determination server 30 in this embodiment. As shown in FIG. 3, the PC 10, the image server 20, and the determination server 30 according to this embodiment are computers including, for example, a Central Processing Unit (CPU) 201, a Random access memory (RAM) 202, and a Read Only Memory (ROM) 203. The CPU 201 performs calculation and control in accordance with software stored in the RAM 202, the ROM 203, or a hard disk 204. The RAM 202 is used as a temporary storage area when the CPU 201 executes various kinds of processing. The hard disk 204 stores, for example, an operating system (OS), and a registration program which will be described later. A display 205 is composed of a liquid crystal display and a graphic controller, and displays objects such as images and icons, a GUI, and the like. An input unit 206 is an apparatus for a user to give various instructions to the PC 10, the image server 20, and the determination server 30, and is composed of, for example, a mouse and a keyboard. An I/F (interface) unit 207 can control wireless LAN communication and wired LAN communication conforming to standards such as the IEEE 802.11a and communicates with an external device through a communication network the same as the wireless and wired LAN communication networks and the Internet based on a protocol such as TCP/IP. A system bus 208 controls the exchange of data with the CPU 201, the RAM 202, the ROM 203, the hard disk 204, and the like.

By the CPU 201 executing the program, a control unit of the component discrimination apparatus functions as the image acquisition unit 101, the dividing unit 102, the specification identifying unit 103, and the specification correctness determination unit 104. Note that the image acquisition unit 101, the dividing unit 102, the specification identifying unit 103, and the specification correctness determination unit 104 may be implemented by different hardware which are connected with each other by the network.

First Embodiment

Figure 4:
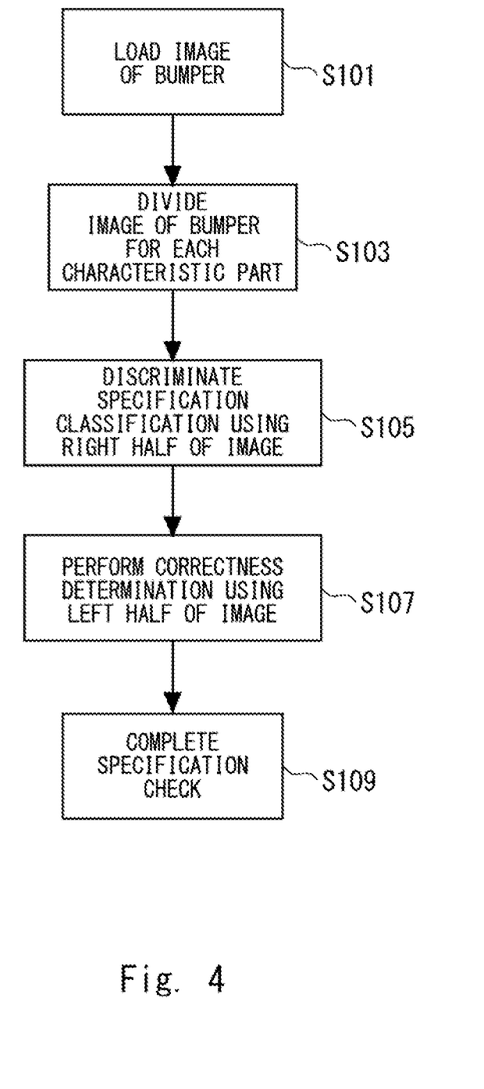
FIG. 4 is an exemplary flowchart of processing for checking specification discrimination performed by a determination server according to a first embodiment of the present disclosure.

Next, processing for checking specification discrimination performed by the determination server 30 according to this embodiment is described with reference to FIG. 4. FIG. 4 is an exemplary flowchart of the processing for checking specification discrimination performed by the determination server according to a first embodiment of the present disclosure.

When the bumper 11 conveyed from the flexible manufacturing line is set at a predetermined position near the bumper assembling apparatus, the camera 13 automatically takes an image of the bumper and loads the image into the PC 10 (Step S101). The loaded image of the bumper is divided into a plurality of parts (e.g., first image-pickup data and second image-pickup data) (Step S103). Each of the plurality of parts includes at least one characteristic part (e.g., a clearance sonar that detects an approach of an obstacle) allowing the specification of the bumper (component) to be identified or allowing the specification classification to be narrowed down. In this example, the image is divided so that the first image-pickup data includes the clearance sonar on the right side of the bumper and the second image-pickup data includes the clearance sonar on the left side of the bumper. As described above, it is desired that the divided images each include the respective characteristic parts arranged substantially symmetrical to each other in the component.

Next, the specification classification is discriminated by the so-called artificial intelligence using the first image-pickup data including the clearance sonar on the right side of the bumper (Step S105). For example, in an offline environment, learning is performed using machine learning such as deep learning by associating a large amount of image data of the bumper with an actual specification (a correct label) of the bumper in the image, thereby creating a learned model. The determination server 30 discriminates the specification classification using such a learned model that is regularly updated. As described above, it is possible to regularly update a learned model to improve the rate of a model determination, and consequently to improve the accuracy of specification determination of the component. For example, the result of the determination is indicated as probability data such as a 100% probability that the bumper is a bumper for a vehicle for the United States market, a 0% probability that the bumper is a bumper for a vehicle for the Japanese market, and a 0% probability that the bumper is a bumper for a vehicle for the Chinese market. A bumper having such probability data higher than a certain threshold (e.g., 60%) may be identified as a vehicle type of the component. In this way, for example, the imaged bumper is identified as the vehicle type of the component of a bumper for a vehicle for the United States market.

Next, by artificial intelligence, a specification check (correctness determination) is performed to determine, using the second image-pickup data including the clearance sonar on the left side of the bumper, whether or not the clearance sonar on the left side of the bumper is the same as the specification of the vehicle type of the component identified in the previous processing (Step S107). That is, it is confirmed whether the clearance sonar which is a characteristic part in the second image-pickup data is the specification of the bumper for a vehicle for the United States market identified in the previous processing. This specification check (correctness determination) can be performed according to whether or not it matches a previously stored master image (a reference image of the bumper for a vehicle for the United States market). Note that although matching may be performed between Computer Aided Design (CAD) data of the component generated by a CAD system and the image-pickup data of the component, the comparison with the master image can be performed in a shorter time.

The clearance sonar which is a characteristic part in the second image-pickup data is normally a bumper for a vehicle for the United States market identified in the previous processing. However, if the clearance sonar on the left is not a bumper for a vehicle for the United States market, it is possible to determine that an assembly defect of the clearance sonar has occurred.

In this way, the processing for checking specification discrimination is completed (Step S109). The result of the determination by the determination server 30 described above may be transmitted to the image server 20 and then transmitted to the PC 10, and may be displayed on a screen (the display 205) as a result of the determination, or as a warning such as an assembly defect.

In this embodiment described above, when the specification classification that requires a relatively long time has been discriminated using the first image-pickup data obtained by dividing the image of the component, the vehicle type of the component is identified, and a specification check (correctness determination), of which the processing can be performed in a relatively short time using the second image-pickup data, is performed. It is thus possible to increase, as a whole, the speed of the processing for checking a specification of a component for a vehicle.

Note that in the above-described embodiment, although the right half of the image is used for specification discrimination and the left half of the image is used for specification correctness determination, the left half of the image may be used for specification discrimination and the right half of the image may be used for specification correctness determination.

Second Embodiment

Figure 5:
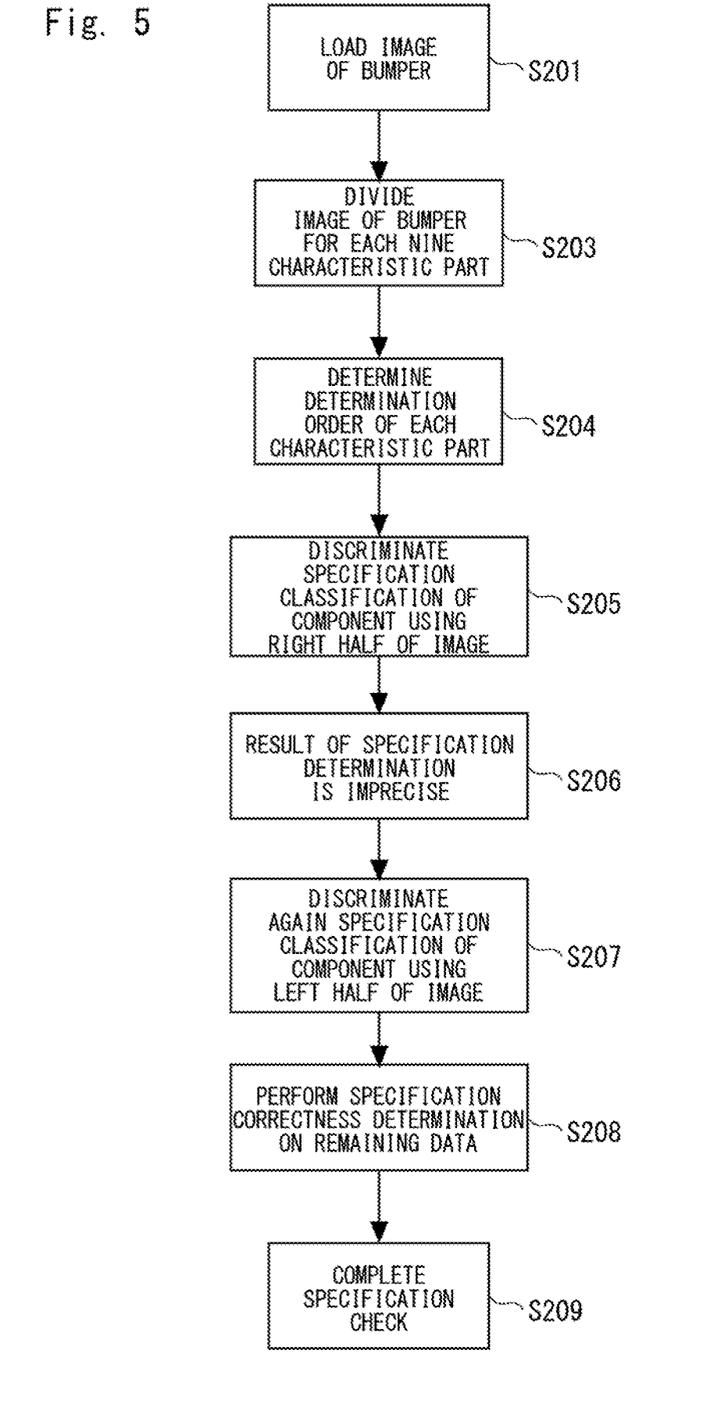
FIG. 5 is an exemplary flowchart of processing for checking specification discrimination performed by a determination server according to a second embodiment of the present disclosure.

Next, processing for checking specification discrimination performed by the determination server 30 according to this embodiment is described with reference to FIG. 5. FIG. 5 is an exemplary flowchart of processing for checking specification discrimination performed by the determination server according to this embodiment of the present disclosure.

When the bumper 11 conveyed from the flexible manufacturing line is set at a predetermined position near the bumper assembling apparatus, the camera 13 automatically takes an image of the bumper and loads the image into the PC 10 (Step S201). Note that it is desired that the camera 13 be a high-resolution camera capable of discriminating a color and be used in combination with a line laser, because a vehicle component such as a bumper usually has a three-dimensional shape and has a color. The loaded image of the bumper is divided into a plurality of parts (in this example, nine characteristic parts) (Step S203). Each of the plurality of parts includes the characteristic part (e.g., left and right clearance sonars, a number plate attachment part, an emblem attachment part, and so on) allowing the specifications of the bumper to be identified.

Next, the order in which specification discrimination is performed for the nine characteristic parts is determined (Step S204). At this time, the order in which specification discrimination is performed for the nine characteristic parts is determined based on the sales volume of the specification classification and the number of characteristic parts required for the specification discrimination so that the average processing time becomes the shortest. For example, when a case in which the specification classification can be identified by looking at five characteristic parts of the nine characteristic parts and a case in which the specification classification can be identified by looking at six characteristic parts of the nine characteristic parts are compared, the average processing time becomes the shortest by preferentially looking at the five characteristic parts. It is thus possible to increase, as a whole, the speed of the processing by minimizing the number of times the specification classification is performed for specification discrimination and performing specification check (correctness determination) for as many characteristic parts as possible.

Figure 6:
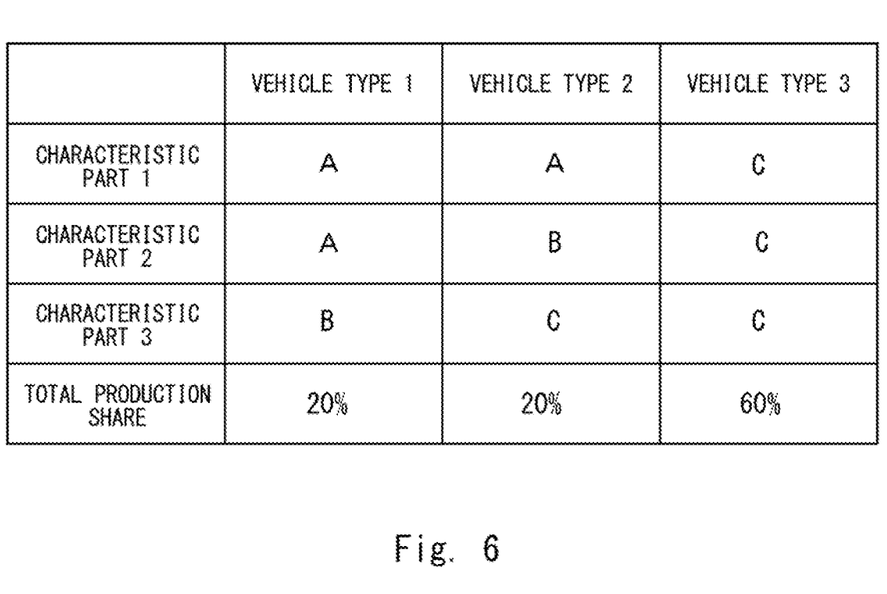
FIG. 6 is a diagram for explaining what kind of criteria are used to determine the order in which specifications of a plurality of characteristic parts are discriminated when vehicle types 1 to 3 of bumpers are discriminated.

In order to further simplify the description, an explanation is given as to what kind of criteria are used to determine the order in which specifications of characteristic parts are classified when vehicle types 1 to 3 of bumpers are discriminated, with reference to FIG. 6.

When the specifications of various components are identified, characteristic parts required for identification are different for each component. FIG. 6 shows the vehicle types 1, 2, and 3 as types of the components, and A, B, and C as specifications of the characteristic parts.

When the specification of a characteristic part 1 is first discriminated, it can be understood that it is the vehicle type 3 if the specification of the characteristic part 1 is C. However, it is not possible to discriminate whether it is the vehicle type 1 or the vehicle type 2 using only the characteristic part 1. Therefore, it is subsequently necessary to further discriminate the characteristic part 2 or the characteristic part 3. The calculation is performed as follows by multiplying "the production share of each vehicle type" by "the number of processes required for identifying each vehicle type".

$$0.2 \times 2 + 0.2 \times 2 + 0.6 \times 1 = 1.4$$

Next, the following calculation is similarly performed also in a case where the specification is first discriminated for the characteristic part 2.

$$0.2 \times 1 + 0.2 \times 1 + 0.6 \times 1 = 1$$

Further, also in a case where the specification of the characteristic part 3 is first discriminated, it can be understood that it is the vehicle type 1 if the specification of the characteristic part 3 is B. However, it is not possible to discriminate whether it is the vehicle type 2 or the vehicle type 3 only using the characteristic part 3. Therefore, it is subsequently necessary to further discriminate the characteristic part 1 or the characteristic part 2. The calculation is performed as follows by multiplying "the share of each vehicle type" by "the number of processes required for identifying each vehicle type".

$$0.2 \times 1 + 0.2 \times 2 + 0.6 \times 2 = 1.6$$

As described above, the minimum calculated value is obtained in the case where the characteristic part 2 is first discriminated. In this way, the order of looking at the plurality of characteristic parts is determined.

Referring to FIG. 5 again, the flowchart is described. When the determination order of each characteristic part has been determined (Step S204), the specification classification is discriminated by the so-called artificial intelligence in accordance with the determined order using each divided image-pickup data of the four characteristic parts on the right side of the bumper (Step S205). As described above, the image is divided into the image group on the right side of the bumper and the image group on the left side of the bumper. This is because the characteristic parts for narrowing down the specification of the component are arranged substantially symmetrical to each other in the component. That is, the specification classification is discriminated based on the characteristic parts symmetrically arranged on one side, and it is sufficient that the specification check be performed only on the characteristic parts on the other side. Learning is performed using machine learning such as deep learning by associating a large amount of image data of the bumper with an actual specification (a correct label) of the bumper in the image, thereby creating a learned model. The specification classification is performed for each characteristic part using such a learned model. For example, the result of the determination by the image group on the right side of the bumper is indicated as probability data such as a 40% probability that the bumper is a bumper for a vehicle for the United States market, a 40% probability that the bumper is a bumper for a vehicle for the Japanese market, and a 30% probability that the bumper is a bumper for a vehicle for the Chinese market. If the maximum probability data of 40% is lower than a certain threshold (e.g., 60%), the result of the determination is determined to be imprecise (Step S206).

When the result of the specification determination is imprecise, the specification classification is discriminated by artificial intelligence using the image-pickup data including the five characteristic parts on the left side of the bumper in accordance with the determined order (Step S207). That is, by looking at the two characteristic parts of the image-pickup data including the five characteristic parts on the left side of the bumper, it is possible to identify the component as a bumper for a vehicle for the United States market with a 70% probability that is higher than the threshold. For the remaining three characteristic parts on the left side of the bumper, a specification check (correctness determination) is performed to determine whether or not each specification of the characteristic parts is the same as that of the vehicle type of the identified component. In the case where the image is divided into at least three as described above, when the specification is discriminated based on the first image-pickup data and the result is imprecise, the specification is again discriminated based on the second image-pickup data, whereby the specification is identified. Then, only specification correctness determination may be performed based on the remaining third image-pickup data (Step S208).

In this way, the processing for checking specification discrimination is completed (Step S209). The result of the determination by the determination server 30 described above may be transmitted to the image server 20 and then transmitted to the PC 10, and may be displayed on a screen as a result of the determination, or as a warning such as an assembly defect.

In this embodiment described above, if the result of the discrimination of the specification classification, which requires a relatively long time using divided image-pickup data of the component, is imprecise, the specification classification can be reliably discriminated by performing again the specification classification using another divided image-pickup data of the component. Further, it is possible to increase, as a whole, the speed of the processing for checking a specification by discriminating the specification classification in accordance with the determination order.

Figure 7:
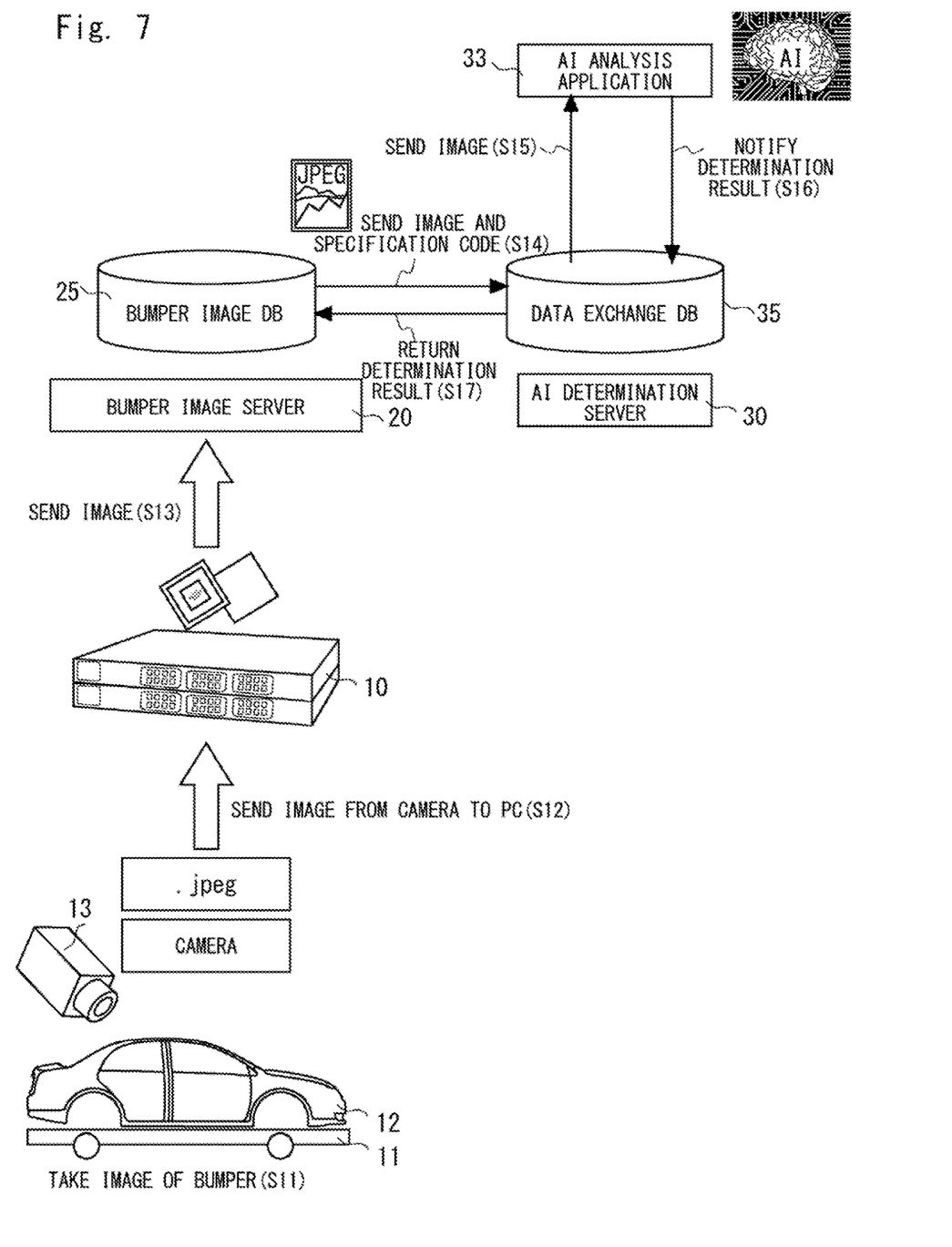
FIG. 7 is a diagram for explaining a component discrimination system according to the embodiment of the present disclosure.

FIG. 7 is a diagram for explaining the component discrimination system according to the embodiment of the present disclosure.

In order to attach the bumper 11 to the vehicle 12, the bumpers 11 of various specifications are conveyed in front of the bumper assembling apparatus. An image (JPEG format) of the bumper 11 is taken by the camera 13 disposed in front of the bumper assembling apparatus (Step S11).

Image-pickup data taken by the camera 13 is transferred to the PC 10 through a network (e.g., Ethernet (registered trademark)) (Step S12).

Next, the PC 10 sends the image to the image server 20 through the network (Step S13) and stores the image in a bumper image database (DB) 25. The image server 20 can acquire a specification code in association with the ALC. Further, the specification code (correct label) is sent together with the image from the image server 20 to the AI determination server 30 (Step S14) and stored in a data exchange database 35. In this way, supervised learning is performed. The data exchange database 35 sends the image to be analyzed to an artificial intelligence analysis application 33 (Step S15). The AI determination server 30 analyzes the image by the artificial intelligence analysis application 33 and notifies the data exchange database 35 of the result of the determination of the specification classification (Step S16). The data exchange database 35 returns the result of the determination to the bumper image database 25 (Step S17).

In the above-described examples, the program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), DVD (Digital Versatile Disc), BD (Blu-ray (registered trademark) Disc), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Note that the present disclosure is not limited to the above-described embodiments, and can be appropriately changed without departing from the spirit of the disclosure.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A component discrimination apparatus, comprising:
at least one processor programmed to:
acquire image-pickup data obtained by taking an image of a component using a camera;
divide the image-pickup data into first image-pickup data and second image-pickup data so that they respectively include at least one characteristic part of the component;
identify a specification of the characteristic part in the first image-pickup data using the first image-pickup data, thereby identifying a type of the component; and
perform, using the second image-pickup data, correctness determination of whether or not a specification of the characteristic part in the second image-pickup data is the same as a specification of the component of the type identified,
wherein a time required to perform the correctness determination is shorter than a time required to identify the specification of the characteristic part.

2. The component discrimination apparatus according to claim 1, wherein
the processor is programmed to:
identify the type of the component with probability data by identifying the specification of the characteristic part using the first image-pickup data, and
when the probability data is lower than a threshold, identify the type of the component by identifying the specification of the characteristic part in the second image-pickup data using the second image-pickup data.

3. The component discrimination apparatus according to claim 1, wherein the processor is further programmed to perform the correctness determination by determining whether the specification of the characteristic second image-pickup data matches a previously stored master image for the component.

4. A manufacturing part discrimination apparatus, comprising:
at least one processor programmed to:
acquire image-pickup data obtained by taking an image of a manufacturing part using a camera;
divide the image-pickup data into first image-pickup data and second image-pickup data so that they respectively include at least one characteristic part of the manufacturing part;
identify a specification of the characteristic part in the first image-pickup data using the first image-pickup data, thereby identifying a type of the manufacturing part; and
perform, using the second image-pickup data, correctness determination of whether or not a specification of the characteristic part in the second image-pickup data is the same as a specification of the manufacturing part of the type identified.

5. The manufacturing part discrimination apparatus according to claim 4, wherein the processor is further programmed to perform the correctness determination by determining whether the specification of the characteristic second image-pickup data matches a previously stored master image for the component.

6. A method for discriminating a manufacturing part, comprising:
acquiring image-pickup data obtained by taking an image of a manufacturing part using a camera;
dividing the image-pickup data into first image-pickup data and second image-pickup data so that they respectively include at least one characteristic part of the manufacturing part;
identifying a specification of the characteristic part in the first image-pickup data using the first image-pickup data, thereby identifying a type of the manufacturing part; and
performing, using the second image-pickup data, correctness determination of whether or not a specification of the characteristic part in the second image-pickup data is the same as a specification of the manufacturing part of the type identified.

7. The method for discriminating the manufacturing component according to claim 6, wherein the correctness determination is performed by determining whether the specification of the characteristic second image-pickup data matches a previously stored master image for the component.

\* \* \* \* \*